(12) United States Patent
Soung et al.

(10) Patent No.: US 7,687,043 B2
(45) Date of Patent: Mar. 30, 2010

(54) HEAT BLOCK ASSEMBLY AND ORGANIC COMPOUND SYNTHESIZING APPARATUS USING THE HEAT BLOCK ASSEMBLY

(75) Inventors: Min-Gyu Soung, Daegu (KR); Jong-Il Park, Daejeon (KR); Seung-Gu Chang, Daejeon (KR); Ho-Il Choi, Daejeon (KR); Heung-Jae Kim, Daejeon (KR)

(73) Assignee: Peptron Co., Ltd, Doryong-dong, Yuseon-gu, Daejeon (KR)

( * ) Notice: Subject to any disclaimer, the term of this patent is extended or adjusted under 35 U.S.C. 154(b) by 362 days.

(21) Appl. No.: 11/763,580

(22) Filed: Jun. 15, 2007

(65) Prior Publication Data

US 2007/0292322 A1    Dec. 20, 2007

(30) Foreign Application Priority Data

Jun. 16, 2006    (KR) .................. 10-2006-0054174

(51) Int. Cl.
*B01J 19/00*    (2006.01)
*B01J 10/00*    (2006.01)
*F28D 7/00*    (2006.01)
*C40B 60/00*    (2006.01)

(52) U.S. Cl. ............... 422/198; 422/129; 422/131; 422/196; 422/201; 435/287.2; 506/33; 506/40

(58) Field of Classification Search ............... 422/198, 422/196, 129, 201, 131; 435/287.2; 506/33, 506/40
See application file for complete search history.

(56) References Cited

U.S. PATENT DOCUMENTS

| 4,213,326 | A | * | 7/1980 | Brodasky | ............ 73/23.37 |
| 5,496,473 | A | * | 3/1996 | Chow | ............ 210/635 |
| 5,766,556 | A | * | 6/1998 | DeWitt et al. | ............ 422/131 |
| 5,866,342 | A | * | 2/1999 | Antonenko et al. | ............ 435/7.1 |
| 5,983,710 | A | * | 11/1999 | Uhen et al. | ............ 73/61.52 |
| 6,503,750 | B1 | * | 1/2003 | Benett et al. | ............ 435/287.2 |
| 2003/0026745 | A1 | * | 2/2003 | Choi et al. | ............ 422/187 |
| 2004/0213083 | A1 | * | 10/2004 | Fujiwara et al. | ............ 366/336 |
| 2006/0243427 | A1 | * | 11/2006 | Kitajima et al. | ............ 165/104.33 |

FOREIGN PATENT DOCUMENTS

WO    97/10896    3/1997

* cited by examiner

*Primary Examiner*—Walter D Griffin
*Assistant Examiner*—Huy-Tram Nguyen (57) ABSTRACT

A heat block assembly and an organic compound synthesizing apparatus using the heat block assembly are provided. The heat block assembly includes one or more heat blocks provided with grooves in which reaction containers are inserted, and a temperature adjustor for adjusting the temperature of the heat block.

8 Claims, 9 Drawing Sheets

HEAT BLOCK ASSEMBLY AND ORGANIC COMPOUND SYNTHESIZING APPARATUS USING THE HEAT BLOCK ASSEMBLY

CROSS-REFERENCE TO RELATED APPLICATION

This application claims priority to and the benefit of Korean Patent Application No. 10-2006-0054174 filed in the Korean Intellectual Property Office on Jun. 16, 2006, the entire contents of which are incorporated herein by reference.

BACKGROUND OF THE INVENTION (a) Field of the Invention

The present invention relates to a heat block assembly and an organic compound synthesizing apparatus using the heat block assembly. More particularly, the present invention relates to a heat block assembly, which is used to construct a chemical library using combinatorial chemistry and can improve organic compound synthesizing efficiency, and an organic compound synthesizing apparatus using the heat block assembly.

(b) Description of the Related Art

Generally, a conventional, typical compound synthesizing method is configured to synthesize a final substance by synthesizing compounds one by one or step by step. Meanwhile, combinatory chemistry is an improved compound synthesizing method that is configured to make a chemical library including the large number of molecules at once and find a new potential drug substance having the highest activation among substances in the chemical library. A compound synthesizing method related to the combinatory chemistry is disclosed in Korean Patent No. 10-0312202. According to the compound synthesizing method disclosed in the patent, a compound synthesizing apparatus having a block assembly in which a plurality of arranged reaction containers each having opposite ends that are bent is disclosed. The organic compound synthesizing apparatus has advantages in that the fixing of the reaction containers, the loading and cleaning of samples, and the outputting of generated substances can be easily realized.

However, although the organic synthesizing apparatus has the above advantages, the organic synthesizing method using the apparatus still has a problem in that synthesizing efficiency of the organic compound is not sufficient.

The above information disclosed in this Background section is only for enhancement of understanding of the background of the invention and therefore it may contain information that does not form the prior art that is already known in this country to a person of ordinary skill in the art.

SUMMARY OF THE INVENTION

Exemplary embodiments of the present invention provide a heat block assembly that can improve yield of compounds by improving organic compound synthesizing efficiency. Exemplary embodiments of the present invention also provide an organic compound synthesizing apparatus having the heat block assembly.

In one exemplary embodiment, a heat block assembly includes one or more heat blocks provided with grooves in which reaction containers are inserted, and a temperature adjustor for adjusting the temperature of the heat block.

Each of the grooves provided on the heat block may correspond to a part of the corresponding reaction container.

The heat block may be disposed above or under the reaction container.

The heat blocks may include a first heat block and a second heat block disposed on the first heat block, and the reaction containers are disposed on the second heat block.

The heat blocks may include a first heat block disposed above the reaction containers, and one or more second heat blocks disposed under the reaction containers.

In another exemplary embodiment, a heat block assembly includes a plurality of heat blocks disposed adjacent to a reaction container, and a temperature adjustor for adjusting the temperature of the heat blocks, wherein the heat blocks include a first heat block disposed above the reaction container and one or more second heat blocks disposed under the reaction container.

In still another exemplary embodiment, an organic compound synthesizing apparatus includes a reaction container assembly having a plurality of reaction containers, one or more heat blocks having grooves in which the reaction containers are inserted, a temperature adjustor for adjusting the temperature of the heat block, and a vacuum pump that is connected to the reaction container assembly to remove a chemical reagent and solvent that are used for reaction in the reaction container.

In still yet another exemplary embodiment, an organic compound synthesizing apparatus includes a reaction container assembly having a plurality of reaction containers, a plurality of heat blocks disposed adjacent to a reaction container, a temperature adjustor for adjusting the temperature of the heat blocks, and a vacuum pump that is connected to the reaction container assembly to remove a chemical reagent and solvent that are used for reaction in the reaction container, wherein the heat blocks include a first heat block disposed above the reaction container and one or more second heat blocks disposed under the reaction container.

DETAILED DESCRIPTION OF THE EMBODIMENTS

The present invention will be described more fully hereinafter with reference to the accompanying drawings, in which exemplary embodiments of the invention are shown.

Figure 1:
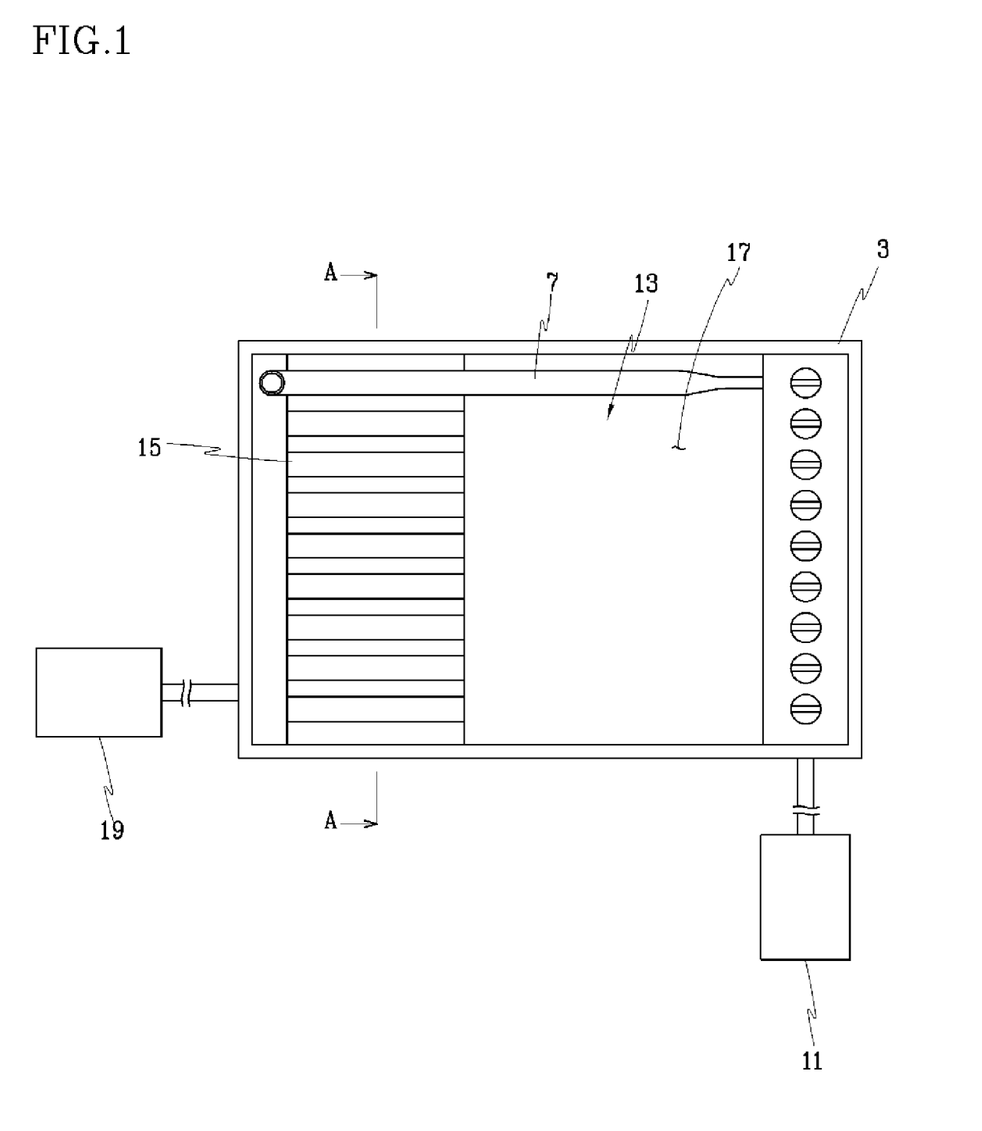
FIG. 1 is a schematic diagram of an organic compound synthesizing apparatus according to a first exemplary embodiment of the present invention.
Figure 2:
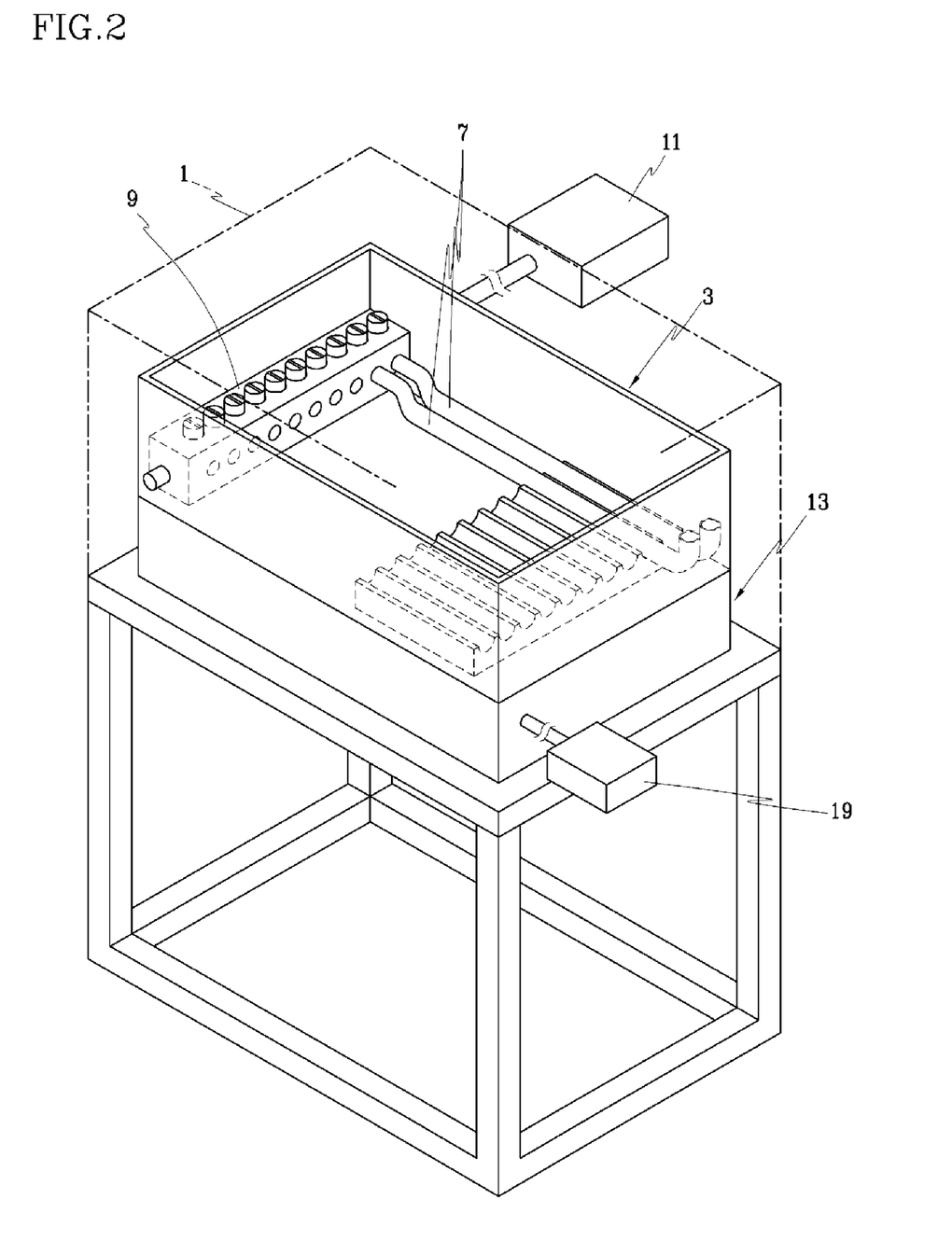
FIG. 2 is a perspective view illustrating major parts of the organic compound synthesizing apparatus depicted in FIG. 1.

FIG. 1 is a schematic diagram of an organic compound synthesizing apparatus according to a first exemplary embodiment of the present invention, and FIG. 2 is a perspective view illustrating major parts of the organic synthesizing compound apparatus depicted in FIG. 1. Referring to FIGS. 1 and 2, an organic compound synthesizing apparatus of this exemplary embodiment includes a chamber 1 defining an enclosed space, a reaction container assembly 3 disposed in the enclosed space of the chamber 1, and a heat block assembly 13 disposed at a lower portion of the reaction container assembly 3.

The chamber 1 may be enclosed to uniformly maintain the temperature inside thereof. The reaction container assembly 3 includes a plurality of reaction containers 7 that are arranged in parallel with each other. Each of the reaction containers 7 may be formed of a glass tube. When the reaction containers 7 are horizontally disposed, a first end portion of each of the reaction containers 7 is bent upward and a second end portion is bent upward and further bent horizontally so that an extreme end of the second end portion is connected to a pipeline 9. As described above, the reaction containers 7 may be disposed in parallel with each other. A vacuum pump 11 for removing a chemical reagent and solvent that are used for the reaction in the reaction containers 7 is connected to the pipeline 9. A portion of the pipeline 9 may be connected to an additional pipeline through which the chemical reagent is discharged. Since the reaction container 7 is disclosed in Korean Patent No. 10-0312202 in detail, a description thereof will refer to this patent. The reaction container 7 and the reaction container assembly 3 are illustrated just by way of example. That is, the reaction container may be formed in a variety of structures.

Figure 3:
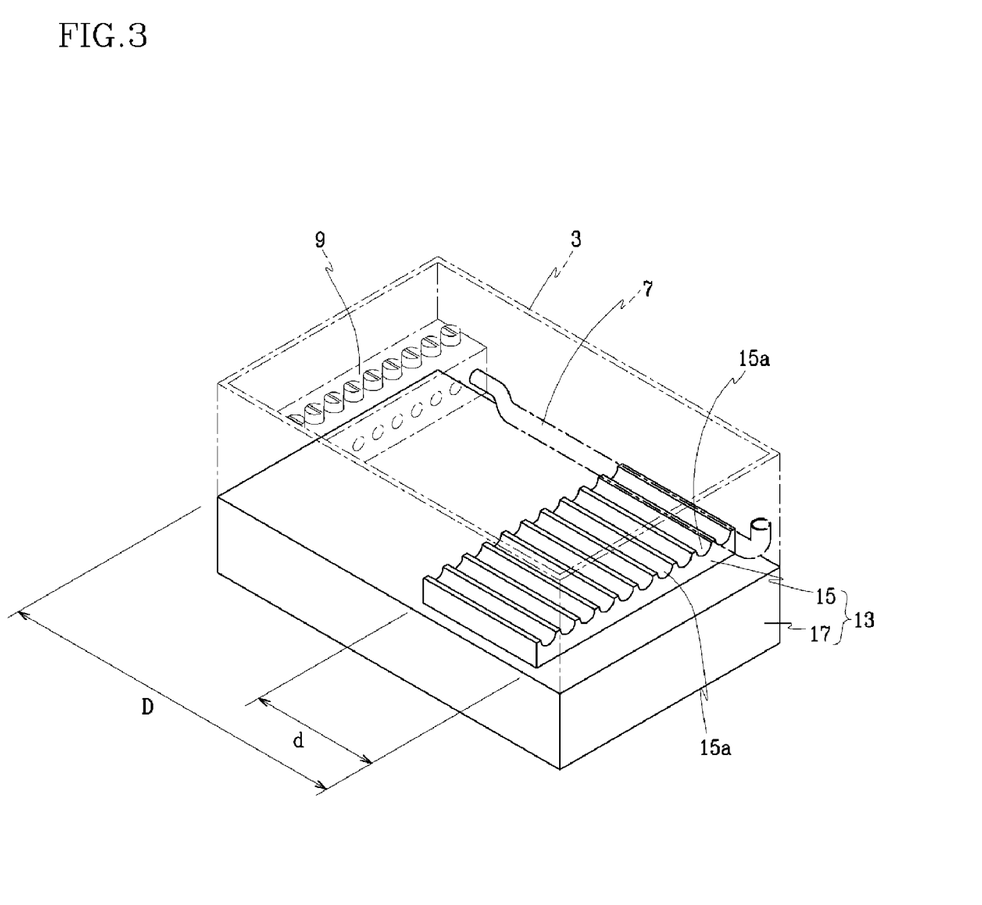
FIG. 3 is a perspective view of a heat block assembly according to a first exemplary embodiment of the present invention.

The heat block assembly 13 may be disposed at the lower portion of the reaction container assembly 3. The heat block assembly 13 includes an upper heat block 15, a lower heat block 17, and a temperature adjustor 19 that can automatically adjust the temperature of the upper and lower heat blocks 15 and 17. The upper heat block 15 is provided with a plurality of grooves 15a. A section of the grooves may correspond to a part of an outer circumference of the reaction container 7 so that the reaction container 7 can be snugly disposed on the corresponding groove 15a. In this embodiment, since the reaction container 7 is formed in a circular tube shape, the section of each of the grooves 15a may be semicircular. The grooves 15a provided on the upper heat block 15 are formed in parallel with each other so that the reaction containers 7 can be arranged in parallel with each other. Further, the reaction containers 7 are partly fitted in or disposed on the grooves 15a of the heat block 15. That is, as shown in FIG. 3, when an overall length of the reaction container 7 is D, a length d of the upper heat block 15 may be less than the overall length D of the reaction container 7. That is, the length d of the upper heat block 15 may be 50-70% of the overall length D of the reaction container 7. As described above, since the length d of the upper heat block 15 is less than the reaction container 7, the reaction containers 7 can be protected from heat generated from the reaction substances.

The lower heat block 17 is disposed under the upper heat block 15. The temperature adjustor 19 that can adjust the temperature of the heat block assembly 13 within a range of 30-100° C. is connected to the lower heat block 15. Desirably, the temperature adjustor 19 may be designed to adjust the temperature within a range of 50-60° C. for the reaction of the substances.

Therefore, by the temperature adjustor 19, the temperatures of the upper and lower heat blocks 15 and 17 can be uniformly maintained. A conventional temperature adjustor can be used as the temperature adjustor 19.

In the exemplary embodiment of the present invention, although the heat block assembly 13 includes the upper and lower heat blocks 15 and 17, the present invention is not limited to this configuration. That is, the upper and lower heat blocks may be formed in an integral structure having the grooves 15a.

Further, the upper heat block 15 may be coupled to the lower heat block 17 by a coupling unit. Alternatively, the upper heat block 15 may be simply seated on the lower heat block 17. A heat wire may be buried in the heat block assembly 13 to convert electrical energy into heat.

Figure 4:
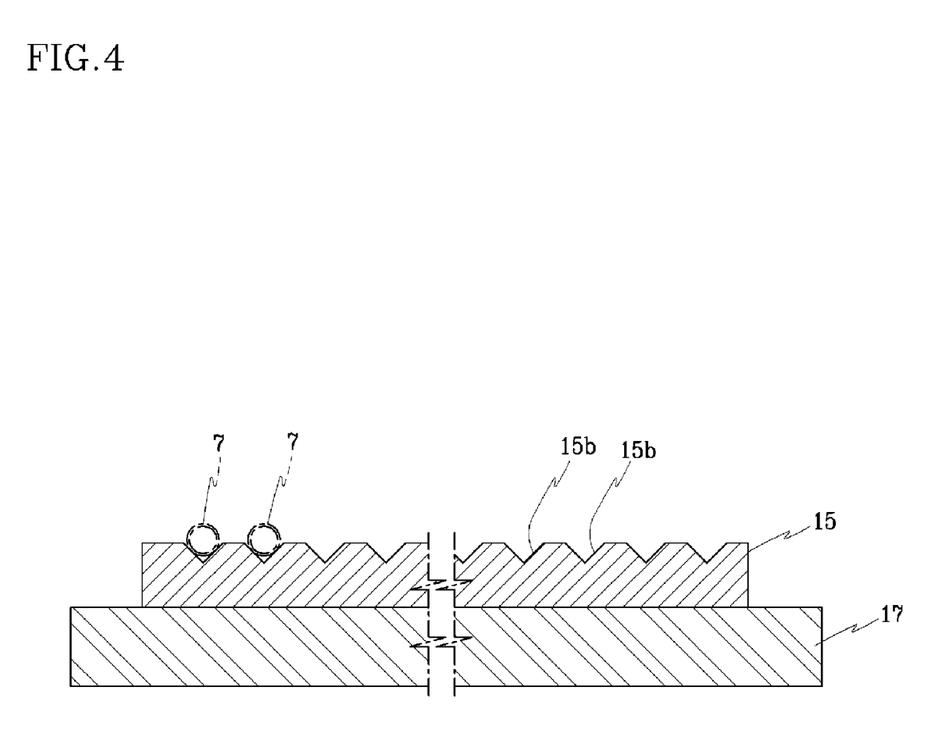
FIG. 4 is a sectional view of an organic compound synthesizing apparatus according to a second exemplary embodiment of the present invention.

FIG. 4 is a sectional view of an organic compound synthesizing apparatus according to a second exemplary embodiment of the present invention. In this exemplary embodiment, the shape of each of the grooves 15a provided on the upper heat block 15 is different from that of the first embodiment. That is, in this second exemplary embodiment, a section of each of the grooves 15b provided on the upper heat block 15 is formed in an inverted triangular shape.

Figure 5:
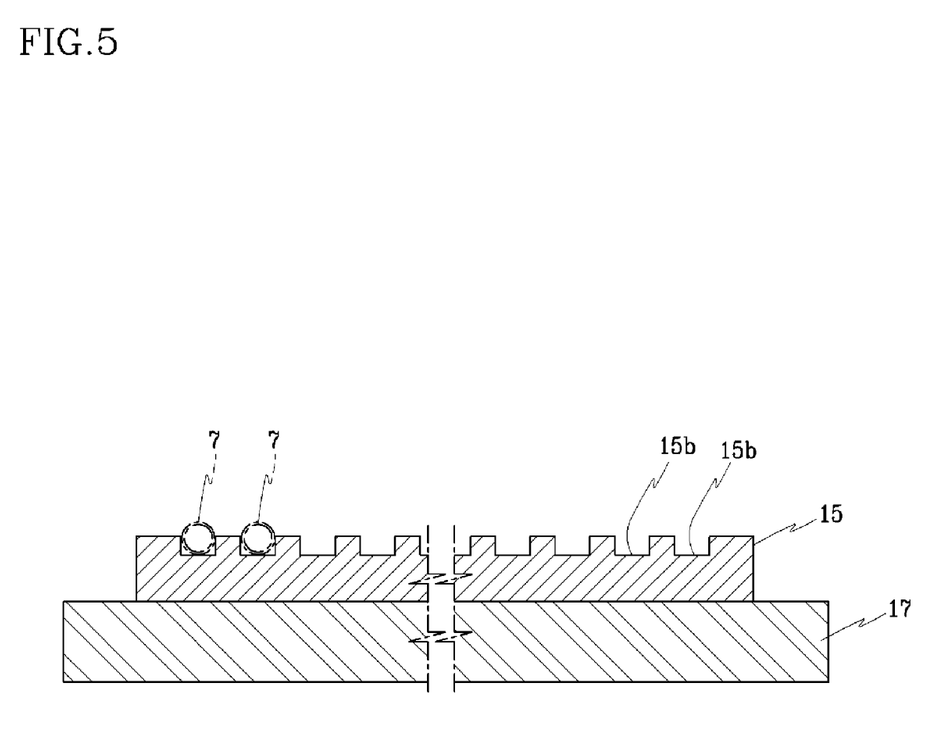
FIG. 5 is a sectional view of an organic compound synthesizing apparatus according to a third exemplary embodiment of the present invention.

FIG. 5 is a sectional view of an organic compound synthesizing apparatus according to a third exemplary embodiment of the present invention. Only a difference from the second exemplary embodiment will be described. In this third exemplary embodiment, a section of each of the grooves 15a provided on the upper heat block 15 is formed in an inverted triangular shape. As described in the foregoing exemplary embodiments, the sectional shape of the grooves provided on the heat blocks 15 may be formed in a variety of shapes such as the semicircular shape, the inversed triangular shape, and a square shape, which can properly transmit the heat to the reaction container 7.

The following will describe a process for synthesizing a peptide using the organic compound reaction apparatus having the heat block assembly. 25 umol of Wang resin (having a loading level of 0.5 mmol/g) whose first amino acid having an N-terminal that is replaced with a Fmoc group was prepared for solid-phase reaction in each of the containers and the Wang resin were washed with dimethylformamide. In order to allow another amino acid to be bonded to the amino acid that is covalent-bonded to the Wang resin, the Fmoc group of the N-terminal was deprotected by a 20% piperidine solution. The acid group of the amino acid that will be introduced was bonded to amine and amide of the terminal of the Wang resin. The activation of the acid group of the amino acid was realized by dissolving 4 equivalents of the amino acid in 600 ul of N-methyl pyrrolidine and mixing 4 equivalents of a chemical reaction reagent (HBTU) with dimethylformamide in which 8 equivalents of a base (N-methylmorpholine) was dissolved. The reaction was performed under a conventional method in which agitation is performed at room temperature (33° C.) for 90 minutes and under a heat block method where the agitation is performed at a temperature of 60° C. for 30 minutes.

By continuously bonding other amino acids according to an order of rank of the amino acid that will be synthesized, desired polypeptides were synthesized.

TABLE 1

| Peptide Name | Peptide Rank | Purity Before Refinement (Room Temperature) | Purity Before Refinement (Heat Block) |
|---|---|---|---|
| 1 | DAEFRHDSGYE | 85% | 90% |
| 2 | DAEFRHDSGYEVHHQUK | 60% | 80% |
| 3 | YEVHHQKLVFF | 85% | 88% |
| 4 | FAEDVGSNKG | 85% | 87% |
| 5 | EDVGSNKGAIIGLM | 90% | 93% |
| 6 | GAIIGLMVGGVV | 93% | 95% |
| 7 | DAEFRHDSGYEVHHQKLVFFAEDVGSNK | 15% | 60% |
| 8 | VHHQKLVFFAEDVGSNK | 20% | 65% |

As shown in Table 1, when the synthesizing is performed under the heat block method where the reaction temperature is higher than room temperature, the purity before refinement was significantly improved. Accordingly, the yield increases even after the synthesized peptide is refined.

Figure 6:
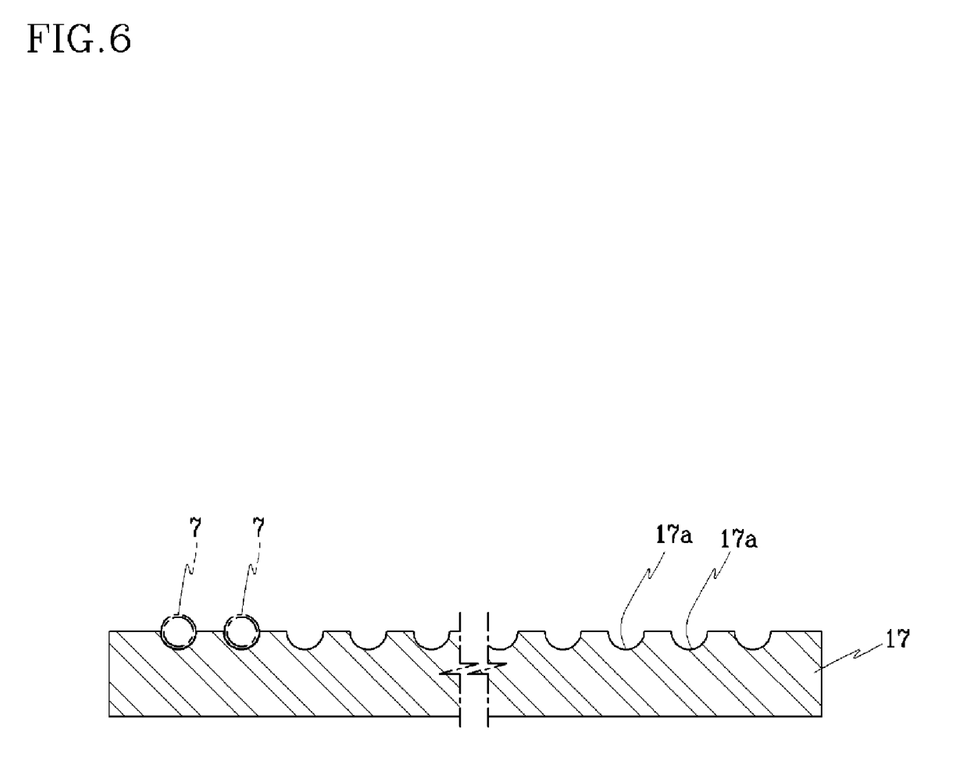
FIG. 6 is a sectional view of an organic compound synthesizing apparatus according to a fourth exemplary embodiment of the present invention.

FIG. 6 is a sectional view of an organic compound synthesizing apparatus according to a fourth exemplary embodiment of the present invention. Only a difference from the second exemplary embodiment will be described. In this fourth exemplary embodiment of the present invention, only one heat block 17 is provided and a plurality of grooves 17a in which reaction containers 7 are inserted are formed on the heat block 17. The heat block 17 is disposed under the reaction containers 7 such that the reaction containers 7 are inserted in the grooves 17a of the heat block 17. According to this fourth exemplary embodiment, since only one heat block is used, the structure is simplified while increasing the reaction efficiency in the reaction containers 7.

Figure 7:
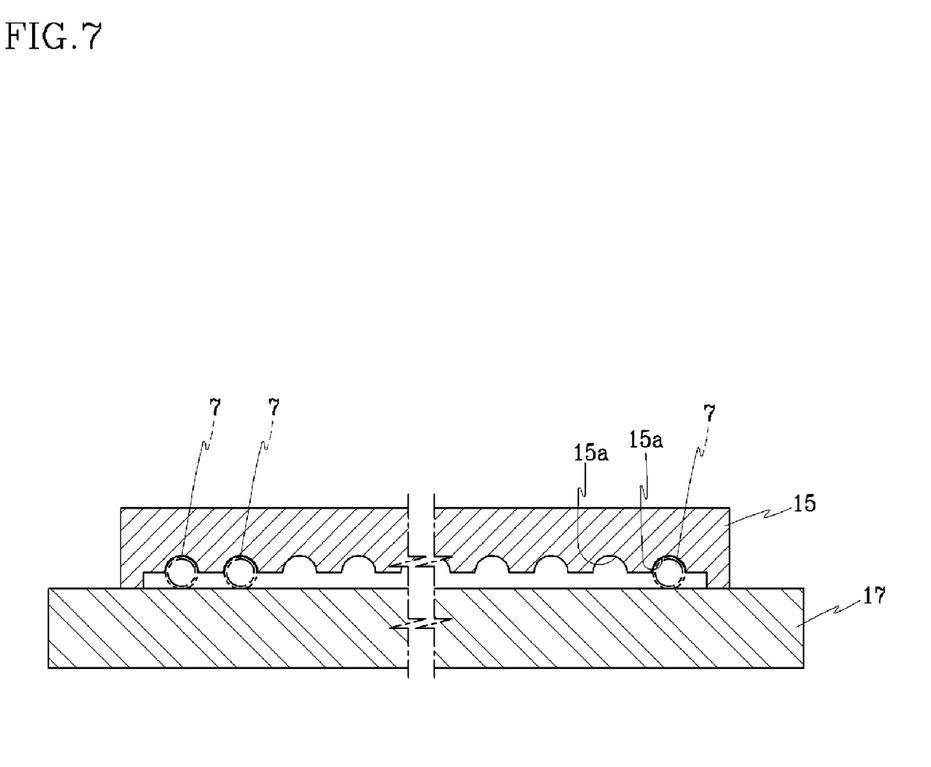
FIG. 7 is a sectional view of an organic compound synthesizing apparatus according to a fifth exemplary embodiment of the present invention.

FIG. 7 is a sectional view of an organic compound synthesizing apparatus according to a fifth exemplary embodiment of the present invention. In this exemplary embodiment, no groove is formed on a heat block 17 on which reaction containers 7 are disposed. Instead, grooves 15a are provided on the bottom of a heat block 15 that is disposed on the reaction containers 7. The reaction containers 7 are inserted in the grooves. The fifth exemplary embodiment of the present invention shows one of a variety of modified examples that can uniformly maintain the temperature of the outer circumferences of the reaction containers 7 to enhance the reaction efficiency. As another modified example, the heat block 17 disposed under the reaction containers 7 may also be provided with grooves in which the reaction containers 7 can be inserted. In this case, the temperature of the outer circumferences of the reaction container 7 can also be uniformly maintained.

Figure 8:
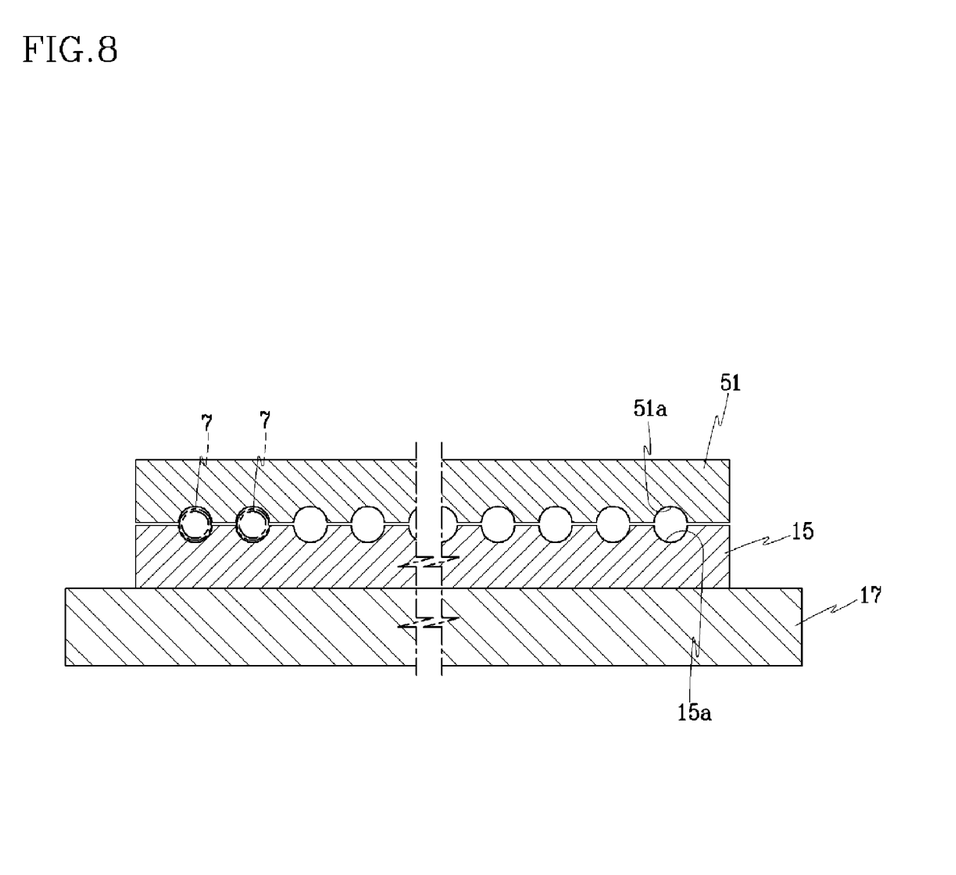
FIG. 8 is a sectional view of an organic compound synthesizing apparatus according to a sixth exemplary embodiment of the present invention.

FIG. 8 is a sectional view of an organic compound synthesizing apparatus according to a sixth exemplary embodiment of the present invention. In this exemplary embodiment, reaction containers are disposed between two sections of an upper heat block. Only a difference from the sixth exemplary embodiment of the present invention will be described hereinafter. In the fifth exemplary embodiment of the present invention, the reaction containers are disposed between the upper and lower heat blocks 15 and 17. However, in this sixth exemplary embodiment of the present invention, the heat blocks supporting the reaction containers are formed in a dual structure. That is, the reaction containers 7 are inserted in grooves 15a formed on a heat block 15 disposed under the reaction containers 7 and the heat block 15 is disposed on a heat block 17. Further, another heat block 51 is disposed on the heat block 15. At this point, the heat block 51 is provided at its bottom with grooves 51a in which the reaction containers 7 are inserted. This sixth exemplary embodiment also shows one of a variety of examples of the present invention.

Figure 9:
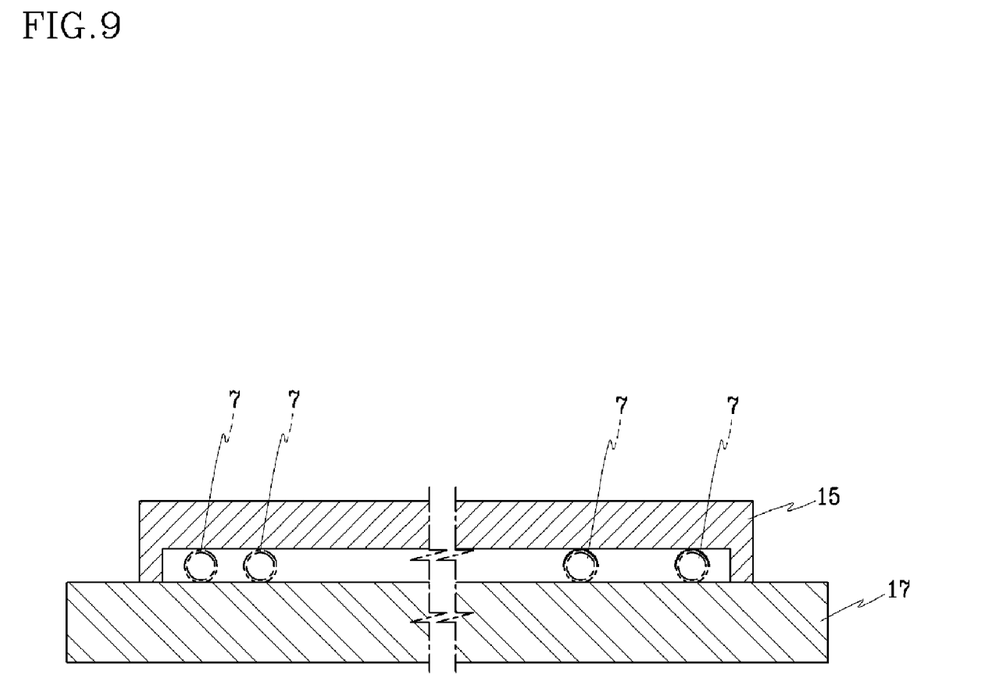
FIG. 9 is a sectional view of an organic compound synthesizing apparatus according to a fourth exemplary embodiment of the present invention.

FIG. 9 is a sectional view of an organic compound synthesizing apparatus according to a seventh exemplary embodiment of the present invention. Only a difference from the second exemplary embodiment will be described. In this exemplary embodiment, reaction containers are disposed between heat blocks 15 and 17 and no grooves are formed on the heat blocks 15 and 17. That is, surfaces of the heat blocks 15 and 17, which face the reaction containers 7, are formed to be planar. According to the seventh exemplary embodiment, since no grooves are formed on the heat blocks 15 and 17, the structure is simplified while uniformly maintaining the temperature of the outer circumference of the reaction containers 7. This seventh exemplary embodiment also shows one of the variety examples of the present invention.

According to the present invention, since an optimal temperature condition can be maintained during the synthesizing of the organic compound, the synthesizing efficiency of the organic compound can be enhanced and thus the yield of the compound can be maximized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A heat block assembly comprising:
   one or more heat blocks provided with grooves in which reaction containers are inserted; and
   a temperature adjustor for adjusting the temperature of the heat block,
   wherein each of the grooves is horizontally disposed,
   each of the grooves provided on the heat block corresponds to a part of the reaction container, the part being an opposite side of an exit of the reaction container, and
   a length d of the heat block is 50-70% of a length D of the reaction container.

2. The heat block assembly of claim 1,
   wherein the heat block is disposed above or under the reaction container.

3. The heat block assembly of claim 1,
   wherein the heat blocks include a first heat block and a second heat block disposed on the first heat block, and the reaction containers are disposed on the second heat block.

4. The heat block assembly of claim 1,
   wherein the heat blocks include a first heat block disposed above the reaction containers and one or more second heat blocks disposed under the reaction containers.

5. An organic compound synthesizing apparatus comprising:
   a reaction container assembly having a plurality of reaction containers;
   one or more heat blocks having grooves in which the reaction containers are inserted;

a temperature adjustor for adjusting the temperature of the heat block; and a vacuum pump that is connected to the reaction container assembly to remove a chemical reagent and solvent that are used for reaction in the reaction container, wherein each of the grooves is horizontally disposed, each of the grooves provided on the heat block corresponds to a part of the reaction container, the part is an opposite side of an exit of the reaction container, and a length d of the heat block is 50-70% of a length D of the reaction container.

6. The organic compound synthesizing apparatus of claim 5, wherein the heat block is disposed above or under the reaction container.

7. The organic compound synthesizing apparatus of claim 5, wherein the heat blocks include a heat block and a second heat block disposed on the first heat block, and the reaction containers are disposed on the second heat block.

8. The organic compound synthesizing apparatus of claim 5, wherein the heat blocks include a first heat block disposed above the reaction containers and one or more second heat blocks disposed under the reaction containers.

* * * * *